United States Patent [19]

Ramun et al.

[11] 4,439,921
[45] Apr. 3, 1984

[54] RAIL BREAKING ATTACHMENT FOR BACKHOES

[75] Inventors: Michael Ramun; John Ramun, both of Youngstown, Ohio

[73] Assignee: Allied Gator, Inc., Youngstown, Ohio

[21] Appl. No.: 361,460

[22] Filed: Feb. 24, 1982

[51] Int. Cl.³ .............................................. F02F 3/28
[52] U.S. Cl. ........................................ 30/134; 30/228; 30/258; 144/34 E; 414/740
[58] Field of Search ................ 30/134, 250, 258, 228; 37/117.5; 414/722, 724, 740; 144/34 E; 294/104

[56] References Cited

U.S. PATENT DOCUMENTS 4,188,721  2/1980  Ramun et al. ..................... 30/134
4,198,747  4/1980  LaBounty ........................... 30/134
4,376,340  3/1983  Ramun et al. ..................... 30/134

FOREIGN PATENT DOCUMENTS 761783  6/1967  Canada ............................ 414/740

Primary Examiner—E. R. Kazenske
Assistant Examiner—Douglas D. Watts
Attorney, Agent, or Firm—Harpman & Harpman

[57] ABSTRACT

A rail breaking attachment for a backhoe, the bucket of which has been removed which enables the backhoe to be used to grasp rail material by pivotally positioning a blade in the form of a hook on the end of a backhoe boom for actuation by a piston and cylinder of the backhoe. A fixed pair of spaced parallel rail engagement members is secured to the boom forming support points on which the rail rests as the movable blade is passed therebetween.

10 Claims, 6 Drawing Figures

RAIL BREAKING ATTACHMENT FOR BACKHOES

BACKGROUND OF THE INVENTION (1) Technical Field:

This invention is used with backhoes as commonly used in industry and specifically in dismantling industrial buildings and the like.

(2) Description of the Prior Art:

Prior art devices of this type are best represented by our U.S. Pat. No. 4,188,721 of Feb. 19, 1980 which shows a backhoe attachment for cutting and moving cables.

Other prior art is represented by U.S. Pat. No. 4,198,747 of Apr. 22, 1980 which discloses a hydraulic shear for a backhoe in which a pair of fixed blades are arranged in spaced relation and a movable blade is arranged for shearing engagement therebetween.

In the present invention, a single fixed blade is fitted with an attachment defining two spaced parallel support members with a single movable blade passing therebetween in spaced relation to said support members. Because of the arrangment of a guide positioned in spaced relation to the spaced parallel support members and against which the hook-shaped blade moves prior to engagement between the parallel support members so that the desired breaking action of the device can be maintained and at the same time the rail piece can be held in position while being broken rather than being expelled as would otherwise occur.

SUMMARY OF THE INVENTION

A rail breaking attachment for a backhoe comprises a fixed blade having a movable hook-shaped breaking blade pivoted thereto and a rail breaking attachment secured thereon being positioned on the end of a backhoe boom in place of a normal bucket. A pair of pivotal arms are secured to the breaking blade and to a hydraulic piston and cylinder on the backhoe. A blade guide is positioned in spaced parallel relation to the fixed blade and the rail breaking attachment which forms means for confining the movable blade to a path between spaced parallel members of the rail breaking attachment wherein it will operate to break the material when it is moved by the hydraulic piston and cylinder.

DESCRIPTION OF THE PREFERRED EMBODIMENT

Backhoes such as used in industry are powered machines having an extensible boom with hydraulic controlled cylinders mounted thereon. A bucket is normally attached to the end of the boom and is moved by one or more hydraulic piston and cylinder assemblies.

Applicant's device in an attachment for a backhoe that is used in place of the bucket for handling and breaking rails and other structural members and the like normally found in structures being dismantled.

Figure 1:
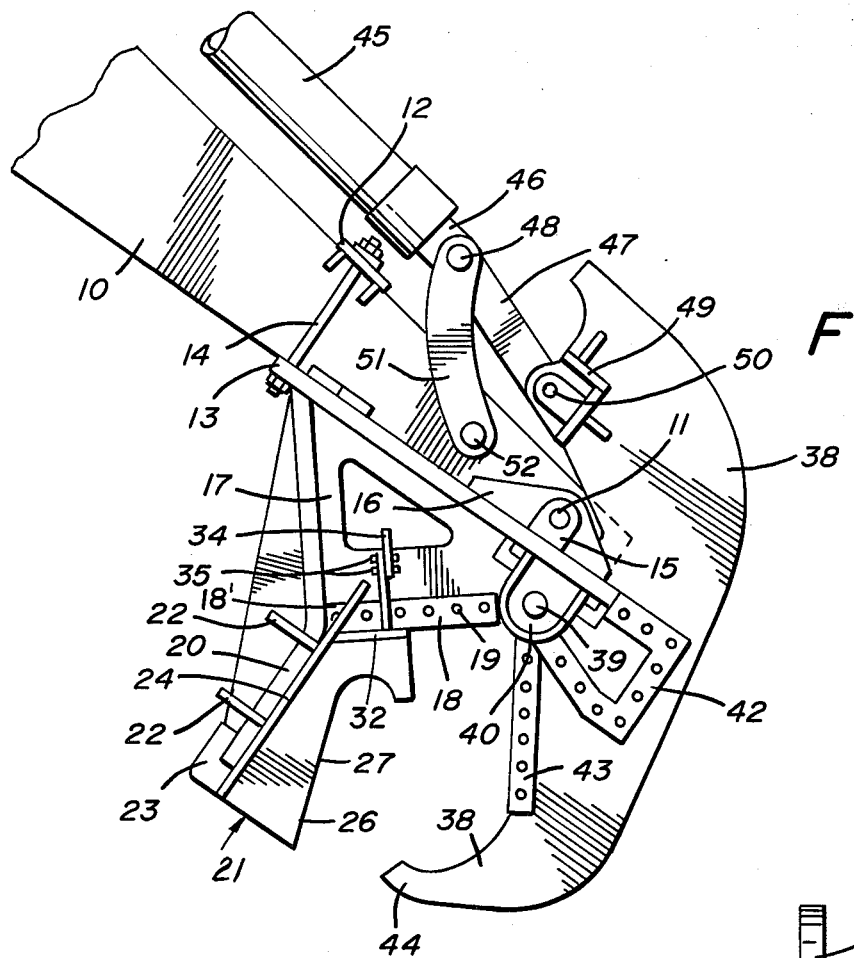
FIG. 1 is a side elevation of the material handling and rail breaker attachment with the hook-shaped blade in open position.
Figure 2:
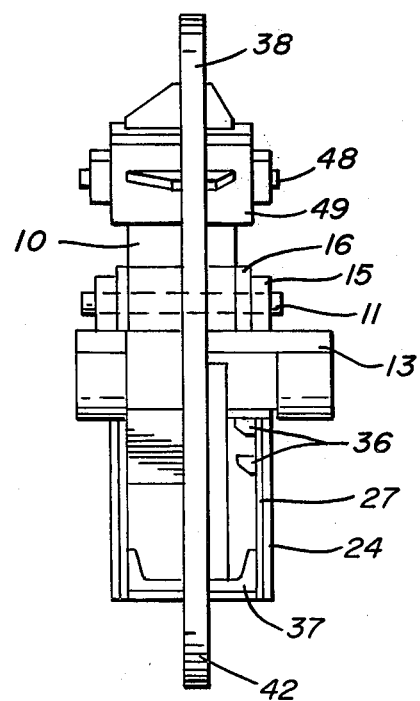
FIG. 2 is an end elevation thereof.
Figure 3:
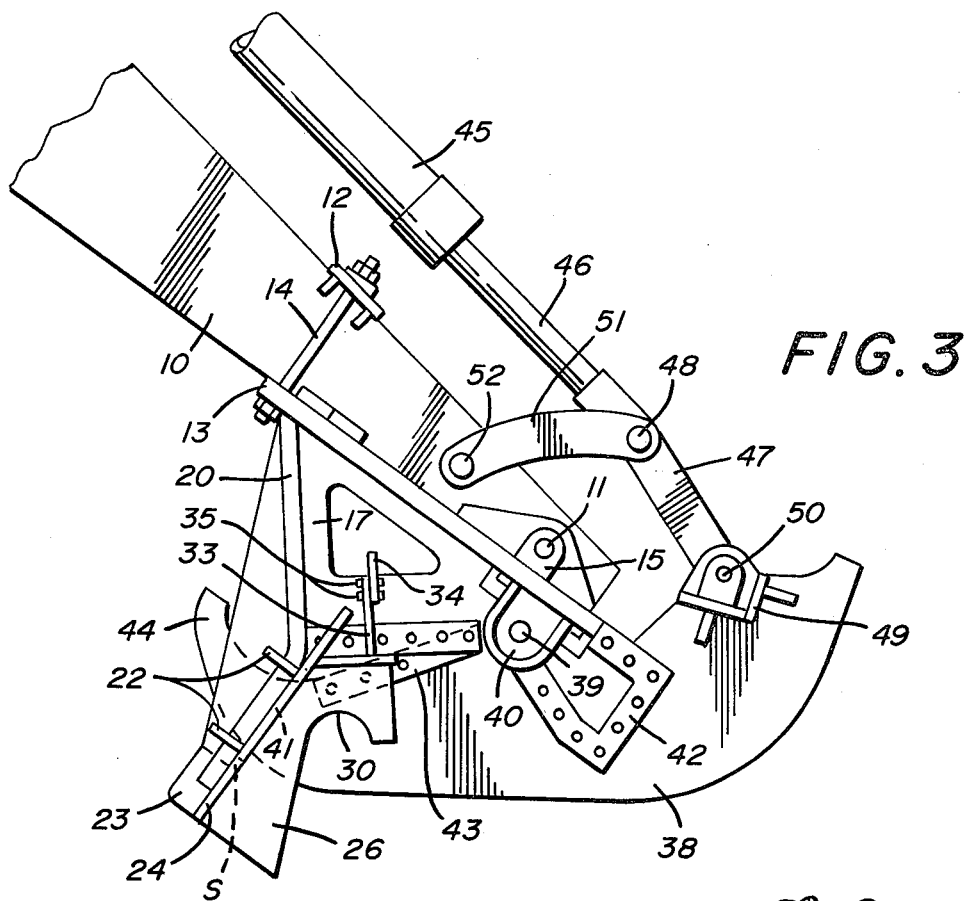
FIG. 3 is a side elevation of the material handling and rail breaker attachment with the hook-shaped blade in closed position.
Figure 4:
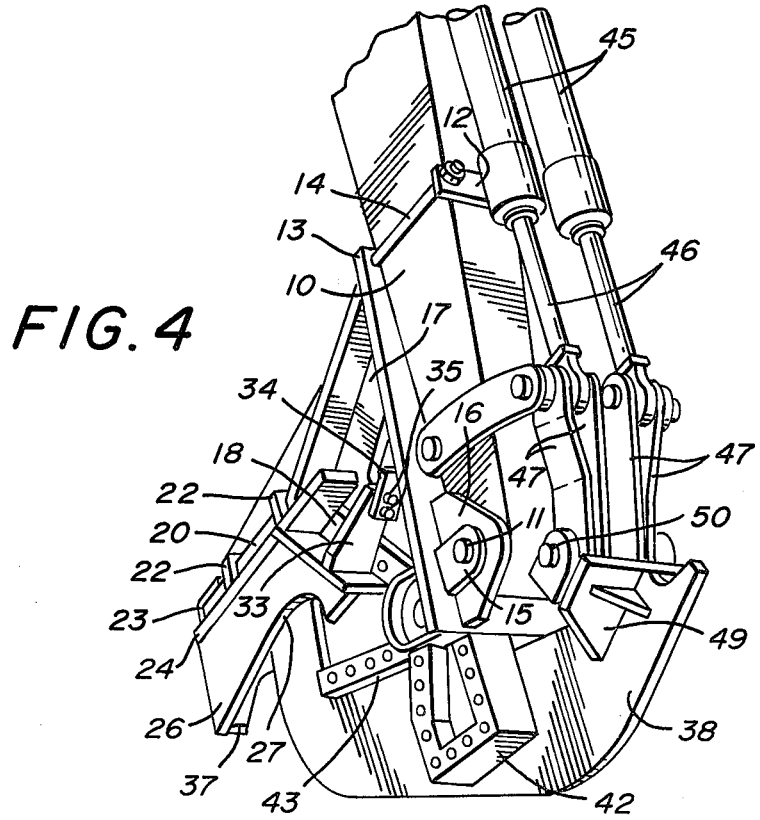
FIG. 4 is a back perspective view of the material handling and rail breaking attachment with the blade in partially closed position.

As will be seen in the drawings, a backhoe boom 10 has a transverse pivot 11 positioned therethrough near its outer end and an apertured plate 12 thereon inwardly of the outer end. A mounting body 13 is secured to the boom 10 on the lower surface thereof as illustrated in FIGS. 1 and 3 of the drawings by fasteners 14 positioned therethrough and through the apertured plate 12 and by spaced apertured lugs 15 on the mounting body 13 engaged on the pivot pin 11. Gussets 16 on the mounting body 13 are also engaged on the pivot pin 11 which can take the form of a suitable bolt and nut assembly.

The opposite or lower side of the mounting body 13 carries a triangular blade supporting body member 17 to which a hardened steel blade 18 is attached by several fasteners 19 and a pair of spaced parallel angular guides 20 are attached to the triangular blade supporting body 17 extending from an end 18' of blade 18 at an obtuse angle with respect to blade 18.

Figure 5:
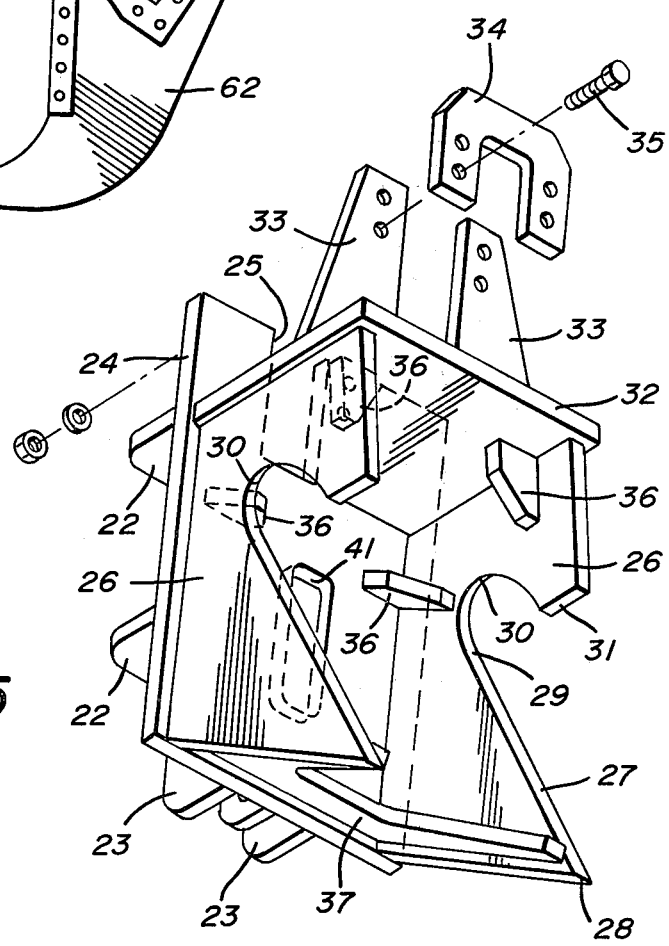
FIG. 5 is a perspective view of the rail breaker attachment.

A rail breaking attachment 21 is secured to the angular guides 20 by pairs of hook-shaped members 22 and a pair of secondary hook-shaped members 23 best seen in FIGS. 1 and 5 of the drawings. The hook-shaped members 22 and 23 extend from and are secured to one side of a main support member 24. A cut out in the main support member at 25 defines the upper end of the main support member 24 and allows the rail breaking attachment to fit around the triangular blade supporting body 17. A pair of spaced parallel rail engagement members 26 are secured to the other side of said main support member 24 at right angles thereto. Each of the rail engagement members 26 has an elongated curved edge 27 extending from a point 28 spaced at a right angle to the lower end of said main support 24 inwardly to a point 29 approximately three-quarters of the length of said main support member 24 and then extends in a tight radius as at 30 outwardly terminating at a point 31 on a line coplanar with said beginning point 28. This outer blade configuration is essentially in the shape of an inverted J. The remaining portion of the edge 27 extends at a right angle from one side of a secondary main support member 32 attached at an angle to said main support member 24 adjacent the cut out at 25 therein. The angles of the main support and secondary support members 24 and 32 respectively match that of the angular guides 20 and the support body 17 as best seen in FIG. 3 of the drawings.

Referring now to FIG. 5 of the drawings, a pair of attachment members 33 extend from the other side of the secondary main support member 32 opposite the rail engagement members 26 in spaced relation to one another having a plurality of openings in each, adjacent their free end. An inverted U-shaped member 34 is fastened to the free ends of said attachment member 33 by fasteners 35. The inverted U-shaped member 34 extends over the hardened steel blade and supporting body 17 holding the rail breaking attachment in place.

Reinforcement gussets 36 are positioned between said rail engagement members 26 and both the main and secondary support members 24 and 32 along with a U-shaped connecting member 37 attached between said rail engaging members 26 and said main support member 24.

A hook-shaped movable breaking blade 38 is pivotally mounted on the mounting body 13 by a pivot pin 39 engaged in spaced brackets 40 which are in turn attached to the lower side of the mounting body 13. The blade 38 has an elongated substantially hook-shaped end 44 hooked generally toward the blade 18. The breaking blade 38 moves in a sissor-like action relative to the fixed blade 18 passing through the opening at 41 and the slot S defined by the angular guides 20. The guides 20 comprise means for keeping the cutting portion (43) of the movable blade 38 in shearing relation to fixed blade 18 throughout the entire extent of the shearing movement of the blades 18, 38 with respect to each other.

A support frame 42 forms the actual point of pivotal engagement with the pin 39, the support frame 42, comprising a hollow reinforcing body, being positioned on the side of the hook-shaped breaking blade 38 opposite the fixed breaking blade 18 where it adds rigidity to the hook-shaped breaking blade 38.

The configuration of the hook-shaped breaking blade 38 is important to the operation of the device as the portion of the blade 38 beyond a hardened breaking edge portion 43 curves outwardly and upwardly with respect to the breaking edge portion 43 to form the relatively large hook-shaped end 44 which will engage and substantially register with the slot S between the spaced parallel angularly disposed guides 20 and the opening at 41 in the main support member 24 before the straight breaking edge portion 43 of the blade comes in to breaking contact with respect to an article within the rail engaging members 26.

In FIG. 1 of the drawings, the hook-shaped breaking blade 38 is shown in open position and it will be observed that due to the hook-shaped end 44 thereof the attachment may be used to grasp and hold rails or the like to be moved and cut and that upon the closing of the hook-shaped blade 38 as seen in FIG. 3 of the drawings, the material will be held against movement from the blade area during the breaking action as the blades 18 and 43 close.

In order that the hook-shaped cutting blade 38 can be moved in a material grasping, holding and breaking action, one or more piston and cylinder assemblies are used and these may comprise the piston and cylinder assemblies normally found on a backhoe boom and normally used to operate the bucket thereon.

In the present disclosure, the arrangement illustrated includes two hydraulic cylinders 45 with the piston rods 46 thereof engaged on links 47 by pivots 48 with the links 47 being pivotally attached to brackets 49 on the opposite sides of the hook-shaped cutting blade 38 by a blade pivot pin 50. Secondary links 51 are also engaged on the pivot pins 48 and on boom pivot pins 52 so that the movable ends of the cylinders 45 will remain in spaced relation to the boom 10 of the backhoe when the material handling and shearing attachment disclosed in the present invention is used.

The device of the present disclosure is similar to that of our U.S. Pat. No. 4,188,721 and comprises an improvement with respect thereto particularly with respect to rail breaking attachment with the provision of the spaced parallel rail engagement members 24 which being attached to the angular guides 20 into which the hooked end 44 of the hook-shaped cutting blade 38 registers and is substantially engaged when the actual breaking action of the rail by the device takes place.

The construction is such that the device can and does handle rails and similar structural members that were incapable of being handled by the device of our U.S. Pat. No. 4,188,721 and 4,376,340 primarily because in the present disclosure the material is supported and held by the rail engagement members 24 in two adjacent areas spaced in relation to one another so that the hook-shaped blade 38 first engages the slot S of the angular guides 20 passing through the opening at 41 in the main support member 24 before it engages and breaks the work piece held therein, which has proven to be satisfactory in actual operation in the field.

Figure 6:
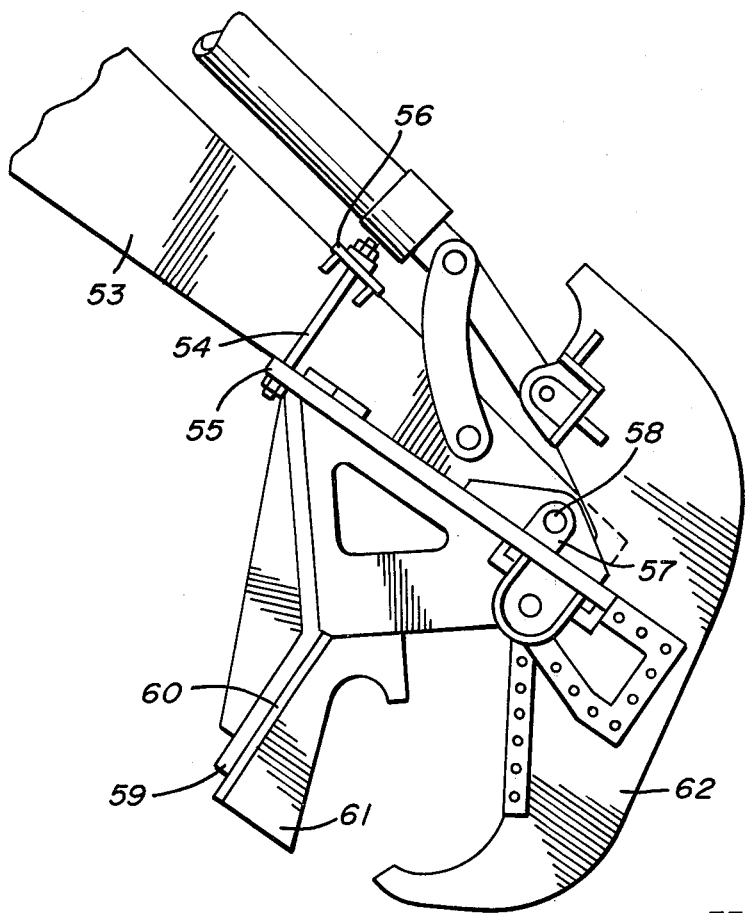
FIG. 6 is a side elevational view of an alternate form of the device.

An alternate form of the invention can be seen in FIG. 6 of the drawings wherein a backhoe boom 53 has an integral rail breaker secured to it by fasteners 54 extending through a mounting body 55 on the lower surface of the boom 53 and an apertured plate 56. Spaced apertured lugs 57 on the mounting body 55 engaged on a pivot pin 58 in the same manner as that of the hereinbefore described device. Extending from the mounting body 55 is a pair of spaced parallel angular guides 59 having an outwardly extending member 60. A pair of oppositely disposed spaced rail engagement members 61 extend from said outwardly extending member 60 and are of a construction similar to that of the rail engagement members 26 as previously described and perform a similar function along with a hook-shaped breaking blade 62 as illustrated and described in the preferred embodiment of the invention as will be understood by those skilled in the art.

Although but two embodiments of the present invention have been illustrated and described, it will be apparent to those skilled in the art that various changes and modifications may be made therein without departing from the spirit of the invention and having thus described our invention.

What we claim is:

1. A cutting and manipulating attachment for a backhoe, the bucket of which has been removed, and having a boom with a controlled piston and cylinder assembly connected thereto, comprising:

a mounting body and means for attaching the same to the boom of the backhoe;

means positioning a fixed cutting blade on said mounting body and means located at a first end of said fixed cutting blade pivotally mounting a movable cutting blade on said mounting body in pivotal relation to said fixed cutting blade;

means for keeping a cutting portion of said movable cutting blade in shearing relation to said fixed cutting blade through the entire extent of the shearing movement of the blades with respect to each other;

said movable blade having an elongated substantially hookshaped end portion hooked generally toward said fixed blade;

said means for keeping the cutting portion of said movable cutting blade in shearing relation to said fixed cutting blade comprising a pair of spaced parallel guides located adjacent and fixed to a second end of said fixed cutting blade and extending from said fixed cutting blade second end at an obtuse angle with respect to said fixed cutting blade and defining an elongated guide path, said guide path being positioned and sized to receive said hook-shaped end portion of said movable hook-shaped cutting blade before said cutting portion of said movable blade comes into shearing action with respect to a workpiece disposed between said blades, so that said hook-shaped end portion and said pair of guides hold the workpiece for cutting as said movable cutting blade cutting portion moves in shearing relation with said fixed blade;

means operatively connecting said movable cutting blade to said piston and cylinder assembly so that the same can be moved relative to said fixed blade thereby; and a rail breaking attachment secured to said parallel guides, said attachment comprising a pair of rail engagement members spaced apart a distance greater than the spacing between said parallel guides, and extending outwardly from said parallel guides toward said movable blade so that the hook-shaped end portion of the movable blade is received between said parallel guides prior to breaking engagement of a rail by said movable blade.

2. A device as recited in claim 1 wherein each of said pair of rail engagement members has a substantially inverted J configuration.

3. A device as recited in claim 1 wherein said rail breaking attachment is secured to said parallel guides by a plurality of pairs of hook-shaped members, and by an attachment member operatively connected to said mounting body.

4. A device as recited in claim 2 wherein said rail breaking attachment is secured to said parallel guides by a plurality of pairs of hook-shaped members, and by an attachment member operatively connected to said mounting body.

5. A cutting and manipulating attachment for a backhoe, the bucket of which has been removed, and having a boom with controlled piston and cylinder connected thereto, comprising:

a mounting body and means for attaching the same to the boom of the backhoe;

means positioning a fixed cutting blade on said mounting body and means located at a first end of said fixed cutting blade pivotally mounting a movable cutting blade on said mounting body in pivotal relation to said fixed cutting blade; and a rail breaking attachment operatively connected to said body and distinct from said fixed blade, said rail breaking attachment including: a pair of rail engagement members straddling said fixed blade, and straddling said movable blade; each of said rail engagement members comprising a rail supporting surface having a substantially inverted J configuration including a leg portion and a radiused portion, said radiused portion disposed adjacent said fixed blade, and said entire rail breaking attachment extending outwardly from said fixed blade toward said movable blade.

6. A device as recited in claim 5 wherein said rail breaking attachment is operatively connected to said body by a pair of attachment members connected to an inverted U-shaped member which is in operative association with said mounting body.

7. A device as recited in claim 1 wherein said rail breaking attachment is operatively connected to said body by a pair of attachment members connected to an inverted U-shaped member which is in operative association with said mounting body.

8. A device as recited in claim 5 further comprising hardened cutting bars attached to the edge of said movable blade.

9. A device a recited in claim 1 further comprising hardened cutting bars attached to the edge of said movable blade.

10. A device as recited in claim 1 further comprising a hollow reinforcing body mounted on said movable cutting blade.

* * * * *